Patented Mar. 8, 1932

1,848,567

UNITED STATES PATENT OFFICE

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE

PROCESS FOR PRODUCING ENAMELS

No Drawing.   Application filed March 7, 1927.   Serial No. 173,607.

My invention relates more particularly to improved methods of enameling in which zirconium is used as an opacifier, and is introduced into the ingredients of the enamel mix for producing the frit subsequently employed for the coating in the finally vitrified enamel products.

The objects of my invention are, among other things, to produce enamels in which the opacity contributed by zirconium or zirconium materials is controlled by adjusting the usual enamel batch so as to leave out part of the silica as ordinarily introduced while replacing the amount of silica omitted by zirconium materials containing silicon.

In producing opacity with zirconium in cases where the opacifier is mixed with the raw materials and smelted together to a fluid enamel, it is important where the opacifier is to be a zirconium material to have this in the form of some compound cheaper than zirconium oxide, because in such methods of producing opacity more of zirconium dissolves in forming the frit than is the case with either antimony or tin oxide.

I have discovered that if an amount of silica ($SiO_2$) equivalent to that introduced in the enamel batch with zircon ($ZrSiO_4$) was omitted by leaving out part of the feldspar while replacing the alumina contained in feldspar and also the alkali contained in such feldspar, a good enamel would result upon smelting and applying the enamel in the usual manner.

In order that the nature of my discoveries may be understood a series of illustrative examples will be set forth to show how my improved methods may be successfully practiced.

The following batch mixture and calculated composition of the enamel melt in Example "A" will serve to illustrate the base formula commonly used which I have substantially changed in subsequent illustrative examples so as to produce an opaque enamel with zirconium materials containing silica, such as zirconium silicate, or double silicates of zirconium and sodium or of zirconium and potassium may be used.

Example A

Batch mixture

| | Parts by weight |
|---|---|
| Potash feldspar | 195.00 |
| Sodium carbonate | 27.50 |
| Sodium nitrate | 17.50 |
| Borax | 125.00 |
| Barium carbonate | 35.00 |
| Zinc oxide | 42.50 |
| Red lead | 42.50 |
| Calcium carbonate | 15.00 |
| Fluorspar | 36.50 |
| Tin oxide | 45.00 |

Calculated composition of melted enamel

| | Per cent |
|---|---|
| Sodium oxide ($Na_2O$) | 10.27 |
| Potassium oxide ($K_2O$) | 3.44 |
| Barium oxide ($BaO$) | 5.62 |
| Calcium oxide ($CaO$) | 2.07 |
| Zinc oxide ($ZnO$) | 8.78 |
| Lead oxide ($PbO$) | 8.57 |
| Calcium fluoride ($CaF_2$) | 7.54 |
| Boric anhydride ($B_2O_3$) | 9.43 |
| Silica ($SiO_2$) | 27.89 |
| Alumina ($Al_2O_3$) | 7.08 |
| Tin oxide ($SnO_2$) | 9.30 |
| | 99.99 |

Expansion coefficient of enamel (calculated) ___ 305
Melting or softening point of enamel ___ 650° C.

This Example "A" enamel, when melted, milled and applied to cast iron, gave an enamel of good opacity, color and lustre.

Example B

This example illustrates the improved method of adjustment discovered and used by me in producing an enamel made opaque with zirconium by introducing the zirconium as zirconium silicate,

Batch mixture

| | Parts by weight |
|---|---|
| Potash feldspar | 124.90 |
| Sodium carbonate | 40.20 |
| Sodium nitrate | 17.50 |
| Borax | 125.00 |
| Barium carbonate | 35.00 |
| Zinc oxide | 42.50 |
| Red lead | 42.50 |
| Calcium carbonate | 15.00 |
| Fluorspar | 36.50 |
| Aluminum hydrate | 20.20 |
| Zirconium silicate | 116.30 |

Calculated composition of melted enamel

| | Per cent |
|---|---|
| Sodium oxide ($Na_2O$) | 10.84 |
| Potassium oxide ($K_2O$) | 2.12 |
| Barium oxide (BaO) | 5.40 |
| Calcium oxide (CaO) | 1.87 |
| Zinc oxide (ZnO) | 8.43 |
| Lead oxide (PbO) | 8.23 |
| Calcium fluoride ($CaF_2$) | 7.24 |
| Boric anhydride ($B_2O_3$) | 9.08 |
| Silica ($SiO_2$) | 25.31 |
| Alumina ($Al_2O_3$) | 6.96 |
| Zirconium oxide ($ZrO_2$) | 14.77 |
| | 100.25 |

Expansion coefficient of enamel (calculated) _____ 304
Melting or softening point of enamel_ 657° C.

This enamel in Example "B" when melted, quenched, dried and milled and applied to cast iron, gave an enamel of good opacity, color and lustre.

In making this adjustment, the amount of potassium omitted with the feldspar was replaced by a molecular equivalent amount of $Na_2O$.

It will be noted that substantially the only major change in the composition was the omission of tin oxide and the substitution of zirconium oxide therefor.

Example C

This example illustrates the adjustment of Example "A" to accommodate a double compound of zirconium with sodium and silicon, namely sodium zirconium silicate.

Batch mixture

| | Parts by weight |
|---|---|
| Potash feldspar | 131.20 |
| Sodium nitrate | 17.50 |
| Borax | 97.70 |
| Boric acid | 17.70 |
| Barium carbonate | 35.00 |
| Zinc oxide | 42.50 |
| Red lead | 42.50 |
| Calcium carbonate | 15.00 |
| Fluorspar | 36.50 |
| Aluminum hydrate | 18.50 |
| Sodium zirconium silicate | 138.30 |

Calculated composition of melted enamel

| | Per cent |
|---|---|
| Sodium oxide ($Na_2O$) | 10.66 |
| Potassium oxide ($K_2O$) | 2.23 |
| Barium oxide (BaO) | 5.40 |
| Calcium oxide (CaO) | 1.88 |
| Zinc oxide (ZnO) | 8.43 |
| Lead oxide (PbO) | 8.23 |
| Calcium fluoride ($CaF_2$) | 7.24 |
| Boric anhydride ($B_2O_3$) | 9.02 |
| Silica ($SiO_2$) | 25.36 |
| Alumina ($Al_2O_3$) | 6.96 |
| Zirconium oxide ($ZrO_2$) | 14.77 |
| | 100.18 |

Expansion coefficient of enamel (calculated) _____ 305
Melting or softening point of enamel_ 650° C.

It will be noted in comparing Example "C" with Example "B" that the result as regards enamel composition was substantially the same. The enamel in Example "C" was of good opacity, color and lustre when applied to cast iron.

Example D

In this example I illustrate a method in which I have used a double compound of zirconium with potassium and silicon.

Batch mixture

| | Parts by weight |
|---|---|
| Potash feldspar | 103.50 |
| Potassium carbonate | 16.80 |
| Potassium nitrate | 20.70 |
| Boric acid | 82.50 |
| Barium carbonate | 35.00 |
| Zinc oxide | 42.50 |
| Red lead | 42.50 |
| Calcium carbonate | 15.00 |
| Fluorspar | 36.50 |
| Aluminum hydrate | 26.50 |
| Potassium zirconium silicate | 186.00 |

Calculated composition of melted enamel

| | Per cent |
|---|---|
| Sodium oxide ($Na_2O$) | 0.71 |
| Potassium oxide ($K_2O$) | 16.63 |
| Barium oxide (BaO) | 5.16 |
| Calcium oxide (CaO) | 1.75 |
| Zinc oxide (ZnO) | 8.07 |
| Lead oxide (PbO) | 7.87 |
| Calcium fluoride ($CaF_2$) | 6.92 |
| Boric anhydride ($B_2O_3$) | 8.68 |
| Silica ($SiO_2$) | 22.23 |
| Alumina ($Al_2O_3$) | 6.74 |
| Zirconium oxide ($ZrO_2$) | 15.25 |
| | 100.01 |

Expansion coefficient (calculated) of enamel _____ 322
Melting or softening point of enamel_ 680° C.

In the Example "D", practically all the $Na_2O$ was replaced by $K_2O$ in molecular equivalent proportion; this accounts chiefly for the lowering percentage of other constituents which is merely incidental to their adjustment.

The enamel produced with Example "D" was of good opacity, color and lustre.

Ordinarily the potassium carbonate and nitrate would be replaced with sodium carbonate and sodium nitrate, or rather the $Na_2O$ as in sodium carbonate would be introduced as borax and the boric acid decreased to keep the $B_2O_3$ the same.

In the foregoing examples the figures for expansion coefficients are those derived by calculation using values commonly used in enameling work, and are included only to illustrate that adjustments have little if any effect upon this constant. In Example "D" this value is a little higher, but it is not enough to seriously effect result. The value in Example "D" could be lowered by minor changes in batch.

The melting point figures show that apparently the ultimate result was the same in Examples "A—B" and "C".

While in Example "D" such melting point could be lowered by a simple adjustment; the high potassium content probably explains the high melting point in this enamel. Furthermore in Examples "B—D" during smelting and decomposition of the enameling ingredients in the presence of the fluxes, part of the zirconium in the batch will undoubtedly combine with the aluminum and zinc to produce opacity, and the low silica content permits such combination at relatively low temperatures upon smelting. Smelting temperatures higher than those designated would be likely to prevent the opaque zirconium combination, and, if previously formed during early stages of the melt, would dissolve such opaque compounds.

It will be seen from a comparison of the foregoing Examples "A—D" that opaque enamels may be successfully produced with zirconium materials containing silicon such as zircon (zirconium silicate), by lowering the amounts of other silicon-bearing materials in the batch mixture and then replacing the silica removed by silica as associated with the zirconium in the zircon introduced as an ingredient of the batch (Example B), or in removing from the batch mixture sufficient silica and alkali or alkali earth bearing substances and then replacing the materials removed by adding compounds containing zirconium along with the substances so removed with the successful production of opaque enamel frits.

Alkali earth materials have been described since it would be of advantage at times to produce from zircon a double calcium zirconium silicate or a double barium zirconium silicate. In such cases if the enamel batch permitted the calcium or barium ingredient could be correspondingly lowered or omitted altogether while replacing same with the required zirconium compound. Again I might make use of a zirconium-silicon combination which would also contain aluminum so that instead of combining the expensive aluminum hydrate, a cheaper aluminum-bearing material such as clay may be employed.

I claim as my invention:—

1. In the process of producing opaque enamel frits, the step which consists in adding to the enamel-forming ingredients in the raw batch and before smelting, zirconium-silicate in such amount that upon subsequent smelting the zirconium and silicon in said zirconium silicate will decompose and yield about 15% zirconium oxide to combine with said ingredients to form an opaque enamel frit.

2. In the process of producing opaque enamel frits, the step which consists in adding to the enamel-forming ingredients in the raw batch and before smelting, zirconium-silicate in such amount that upon subsequent smelting the zirconium and silicon in said zirconium-silicate will decompose and yield about 15% zirconium oxide to combine with said ingredients to form an opaque enamel frit.

3. In the process of producing opaque enamel frits, the step which consists in adding to the enamel-forming ingredients including substances containing aluminum and zinc in the raw batch and before smelting, zirconium-silicate in such amount that upon subsequent smelting the zirconium and silicon in said zirconium-silicate will decompose and yield about 15% zirconium oxide to combine with the aluminum and zinc to form an opaque enamel frit.

4. In the process of producing opaque enamel frits, the step which consists in adding to the enamel-forming ingredients including substances containing aluminum and zinc in the raw batch and before smelting, zirconium-silicate in such amount that upon subsequent smelting the zirconium and silicon in said zirconium-silicate will decompose and yield about 15% zirconium oxide to combine with the aluminum and zinc to form an opaque enamel frit.

5. An opaque enamel glass or frit for enameling or glazing having a relatively low melting point and initially comprising in the raw batch enameling ingredients including zirconium-silicate which when smelted contain in said glass or frit silica about 25%; alumina about 7%; zinc oxide not to exceed 10%; and zirconia about 15%.

CHARLES J. KINZIE.